(No Model.)

A. R. PECHINEY.
MANUFACTURE OF CHLORINE.

No. 390,895. Patented Oct. 9, 1888.

WITNESSES.
H. C. Newman.
E. S. Newman.

INVENTOR.
A. R. Pechiney.
By his Attorneys
Baldwin, Davidson & Wight.

United States Patent Office.

ALFRED RANGOD PECHINEY, OF SALINDRES, GARD, FRANCE, ASSIGNOR TO THE WELDON'S CHLORINE PROCESSES COMPANY, (LIMITED,) OF WESTMINSTER, ENGLAND.

MANUFACTURE OF CHLORINE.

SPECIFICATION forming part of Letters Patent No. 390,895, dated October 9, 1888.

Application filed June 9, 1888. Serial No. 276,586. (No specimens.) Patented in England June 23, 1884, No. 9,305.

*To all whom it may concern:*

Be it known that I, ALFRED RANGOD PECHINEY, a citizen of the Republic of France, residing at Salindres, (Gard,) in the Republic of France, have invented certain new and useful Improvements in and relating to the Manufacture of Chlorine, (for which I have received Letters Patent in Great Britain, No. 9,305, dated June 23, 1884,) of which the following is a specification.

This invention relates to the production of free chlorine and hydrochloric acid by heating the chloride or oxychloride of magnesium or of manganese or of other metal at a high temperature in the presence of oxygen or steam, leaving as the result of such treatment the oxide or oxides of the said metal or metals. The heating should be performed out of contact with the products of combustion of the fuel employed, and hitherto it has been effected within closed receptacles—such as crucibles, muffles, and the like—heated externally, the heat passing through the sides of the receptacle. This involves waste of heat and makes it difficult or impossible to obtain a very high temperature.

My invention consists in effecting the operation of heating the chlorine-yielding substances in presence of atmospheric or other oxygen by placing them in receptacles formed by a suitable arrangement of masses of brickwork or other material, which masses have previously been heated to a sufficient temperature by contact with hot products of combustion or other hot gases which have been caused to traverse the interior of the receptacles, but the admission of which has been suspended before the receptacles are charged with the chlorine-yielding substances, which are then heated at the expense of the heat previously stored up in the masses of brick-work constituting the walls, sides, and floors of the receptacles.

The drawings show an apparatus suitable for carrying out my invention.

Figure 1:
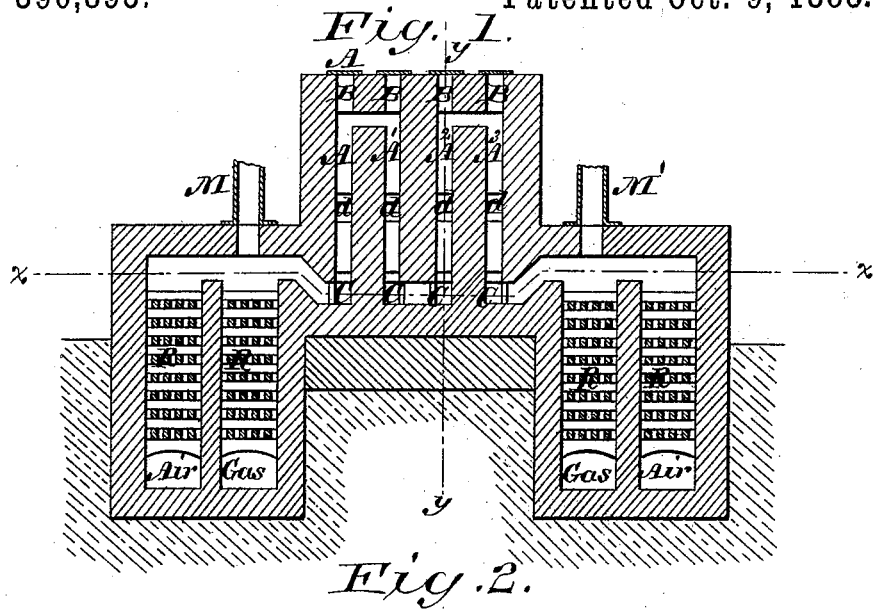
Figure 2:
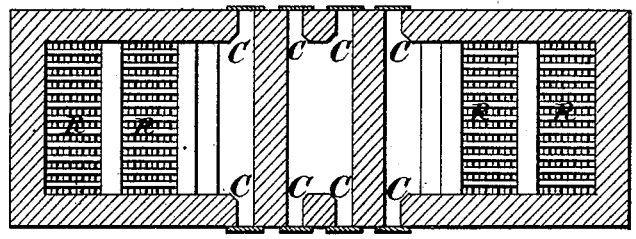
Figure 3:
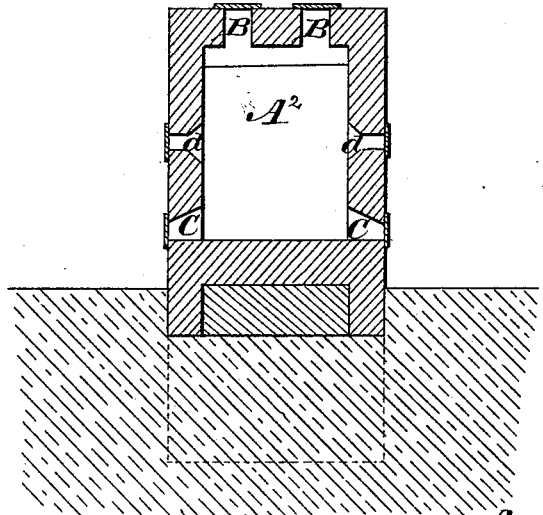

Figure 1 is a vertical section. Fig. 2 is a sectional plan on the line $x\,x$, Fig. 1. Fig. 3 is a transverse vertical section on the line $y\,y$, Fig. 1.

In this apparatus there are four vertical chambers, A, A', A², and A³. These chambers are of small diameter, but their walls or partitions are relatively thick. The four chambers communicate with each other alternately at their upper and at their lower extremities, so that gases entering at the bottom of chamber A can pass from the top of chamber A into chamber A', then from the bottom of chamber A' into the lower part of chamber A², then from the upper part of chamber A² into chamber A³, and then from the bottom of chamber A³, according to circumstances, as will be hereinafter explained, either through the pipe M' or into and through one of the two regenerators R R and R R and thence to a chimney. It will be evident from the drawings that gases can equally traverse the apparatus in the contrary direction, and in working the apparatus it will be convenient that they should traverse it in the one direction and in the other alternately. The substance to be heated in these chambers is introduced thereinto by the openings at B B B B, which openings can be closed at will by suitable covers, and the residual contents of the chambers are afterward discharged by doors at C C C C. The openings $d\,d\,d\,d$, which, like B B B B and C C C C, are capable of being opened and closed at will, are for the purpose of enabling the interior of the chambers to be seen into, when required, and also for the introduction, when need be, of tools by which to facilitate the operation of discharging the chambers.

The regenerators R R and R R are not essential to the apparatus, but their employment will usually be advantageous.

As will be well understood, the apparatus should preferably be incased externally by iron plates coated with some non-conducting substance.

In working this apparatus the first step will be to heat the four chambers A, A', A², and A³. We will suppose that the fuel employed is gaseous fuel, and that in the operation of heating up the apparatus for the first time gaseous fuel is admitted into one of the compartments of the regenerator on the side C of Fig. 1, and the air to burn it into the other compartment of that one of the two regenerators. The pipes M and M' being closed, products of combustion will enter the bottom of chamber A and will traverse successively chambers A', A², and A³, passing off by the regenerator on the side D of Fig. 1. When the masses of brick-work or other material constituting the sides, top, and bottom of the four chambers A, A', A², and A³ have absorbed a sufficient quantity of heat, the admission of gaseous fuel will be suspended and the chambers will be charged by the openings at B B B B with the substance or mixture of substances from which chlorine is to be driven off by the reaction upon that substance or mixture of substances at a suitable temperature of atmospheric or other oxygen. The regenerator by which products of combustion passed off from the apparatus while it was being heated the first time will now be closed and air only be admitted through the other regenerator, the pipe M being kept closed, but communication being opened with the pipe M'. The substance or mixture of substances charged into the chambers A, A', A², and A³ will absorb heat from the masses of heated brick-work, or the like, forming the sides, &c., of the said chambers, and a current of air which has been previously more or less heated will pass over and through the contents of the four chambers, and there will pass off by the pipe M' a mixture of gases containing free chlorine. When the charge in the four chambers A, A', A², and A³ has been in this way sufficiently decomposed, the residual solid product of the reaction of oxygen on the substance or mixture of substances which was originally charged thereinto will be discharged by the doors at C C C C, the pipes M and M' will be closed, and the apparatus will again be heated up as before, except that this time the gaseous fuel and the air to burn it will enter by the regenerator by which, in the first operation of heating up the apparatus, the products of combustion which had traversed the apparatus passed off from it, and that products of combustion will thus traverse the apparatus in the opposite direction to that in which they then traversed it. When the apparatus has been a second time sufficiently heated, the admission of fuel will be suspended as before, and the chambers will be again charged with solid substance capable of yielding free chlorine on being heated in a current of air; but this time the apparatus will be traversed by air in the direction A³ to A, a mixture of gases containing free chlorine passing off by the pipe M.

In this description of the mode of working of the apparatus I have spoken of its being heated by means of gaseous fuel; but it may be heated by the products of the combustion of any kind of fuel, burned in whatever kind of fire-place; and, as I have already indicated, it may be worked either with or without regenerators, and the oxygen employed to react upon the chlorine-yielding substance or mixture of substances may be either atmospheric oxygen or oxygen from any other source.

The products of combustion which have traversed the apparatus should preferably be employed for evaporative purposes before being allowed to pass to the chimney. The chloride or chlorides from which free chlorine is to be obtained by heating it or them in contact with oxygen will frequently be first obtained in aqueous solution, which solution will require to be evaporated to dryness before such chloride or chlorides can be subjected to the action of heat and air, and the said products of combustion may conveniently be used in such case for evaporating the said solution of such chloride or chlorides.

The mixture of gases containing free chlorine which passes off by the pipes M and M' may in some cases contain vapor of hydrochloric acid. In such case, as will be well understood, the said mixture of gases before passing on to the apparatus in which its chlorine is to be utilized, should be passed through apparatus in which the vapor of hydrochloric acid, at first associated with it, may be condensed out from it.

Having now particularly described and ascertained the nature of my said invention and in what manner the same is to be performed, I declare that what I claim is—

The process of manufacturing chlorine and hydrochloric acid by heating the chloride or oxychloride of magnesium or of manganese, or of other metal, in the presence of oxygen or steam, and out of contact with the products of combustion of the fuel employed, by introducing it into receptacles which have been previously heated to a sufficient temperature by contact with hot products of combustion or other hot gases which have been caused to traverse the interior of the receptacles, but the admission of which has been suspended before the receptacles are charged with the chlorine-yielding substances, substantially as described.

ALFRED RANGOD PECHINEY.

Witnesses:
 THOS. BARBOUR,
 J. FOLEMS.